United States Patent
Milito et al.

(10) Patent No.: US 7,043,467 B1
(45) Date of Patent: May 9, 2006

(54) WIRE-SPEED MULTI-DIMENSIONAL PACKET CLASSIFIER

(75) Inventors: Rodolfo Milito, Los Gatos, CA (US); Adolfo Nemirovsky, San Jose, CA (US); Mario Nemirovsky, Los Gatos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 186 days.

(21) Appl. No.: 09/586,115

(22) Filed: Jun. 2, 2000

Related U.S. Application Data

(60) Provisional application No. 60/180,998, filed on Feb. 8, 2000.

(51) Int. Cl.
*G06F 17/00* (2006.01)
*G06N 5/00* (2006.01)

(52) U.S. Cl. .............................. 706/45; 706/46; 706/47
(58) Field of Classification Search ................... 706/45, 706/46, 47; 709/243; 356/39; 370/402
See application file for complete search history.

(56) References Cited

U.S. PATENT DOCUMENTS

| | | | |
|---|---|---|---|
| 5,414,650 A | 5/1995 | Hekhuis | |
| 5,956,721 A | 9/1999 | Douceur et al. | |
| 5,995,971 A | 11/1999 | Douceur et al. | |
| 6,041,053 A | 3/2000 | Douceur et al. | |
| 6,167,047 A | 12/2000 | Welfeld | |

OTHER PUBLICATIONS

T. V. Lakshman et al; High–Speed Policy–based Packet Forwarding Using Efficient Multi–dimensional Range Matching; Jan. 1998; ACM; 1–58113–003–1/98/0008; 203–214.*

Ungerer, Theo. et al., "Survey of Processors with Explicit Multithreading with Explicit Multithreading," ACM Computing Surveys, vol. 35, No. 1, Mar. 2003, pp. 29–63.

* cited by examiner

*Primary Examiner*—Anthony Knight
*Assistant Examiner*—Joseph P. Hirl
(74) *Attorney, Agent, or Firm*—Richard K. Huffman; Donald R. Boys; James W. Huffman

(57) ABSTRACT

For routing packets by rules in a packet network, a system and method in a routing device for selecting rules to apply to packets having each N fields in a header, considers rules as entities in N-dimensional space, projects the rules onto N-axes in the space, marks the beginning and ending of each projection as breakpoints, numbers intervals between breakpoints in sequential binary numbers, associates a subset of the set of rules as applicable to each interval between breakpoints on each axis, then considers a packet as a point in the N-dimensional space according to its header field values, locates the binary numbered interval into which the point projects on each axis by performing a search on each axis for the numbered interval into which the point projects on that axis, thereby determining the subset of rules applying to the packet for that axis, and determines the second set of matching rules from the subsets of rules by selecting those rules as matching the packet that apply to the packet on at least one of the N axes. Optional and enhanced methods are taught for special circumstances.

23 Claims, 9 Drawing Sheets

| Field A (X coordinate) | | |
| --- | --- | --- |
| Breakpoint | Interval | Bitmap |
| 01 | 001 | 000 |
| 03 | 010 | 001 |
| 07 | 011 | 101 |
| 0E | 100 | 001 |
| 17 | 101 | 011 |
| 1C | 110 | 010 |
| 1F | 111 | 000 |
| Field B (Y coordinate) | | |
| Breakpoint | Interval | Bitmap |
| 03 | 001 | 000 |
| 04 | 010 | 100 |
| 09 | 011 | 110 |
| 0B | 100 | 100 |
| 13 | 101 | 101 |
| 1B | 110 | 100 |
| 1F | 111 | 000 |

*Fig. 2*

| First Step - Field A   X-axis ||
|---|---|
| Breakpoint | Pointer to the next step |
| 07 | If >, then   1 |
|  | If <, then   0 |
| First Step - Field B   Y-axis ||
| Breakpoint | Pointer to the next step |
| 09 | If >, then   1 |
|  | If <, then   0 |

*Fig. 4*

| Second Step - Field A   X-axis | | |
|---|---|---|
| Pointer from 1st module | Breakpoint | Pointer to 3rd step |
| 1 | 17 | If >, then 11 |
| | | If <, then 10 |
| 0 | 01 | If >, then 01 |
| | | If <, then 00 |
| Second Step - Field B   Y-axis | | |
| Pointer from 1st module | Breakpoint | Poi9nter to 3rd step |
| 1 | 13 | If >, then 11 |
| | | If <, then 10 |
| 0 | 03 | If >, then 01 |
| | | If <, then 00 |

*Fig. 5*

| Third Step - Field A     X-axis |||
| --- | --- | --- |
| Pointer from 2nd module | Breakpoint | Interval Number |
| 11 | 1C | If >, then 111 |
|  |  | If <, then 110 |
| 10 | 0E | If >, then 101 |
|  |  | If <, then 100 |
| 01 | 03 | If >, then 011 |
|  |  | If <, then 010 |
| 00 | None | Must be 001 |
| Third Step - Field B     Y-axis |||
| Pointer fron 2nd module | Breakpoint | Interval Number |
| 11 | 1B | If >, then 111 |
|  |  | If <, then 110 |
| 10 | 0B | If >, then 101 |
|  |  | If <, then 100 |
| 01 | 04 | If >, then 011 |
|  |  | If <, then 010 |
| 00 | None | Must be 001 |

*Fig. 6*

WIRE-SPEED MULTI-DIMENSIONAL PACKET CLASSIFIER

This application claims the benefit of Ser. No. 60/180,998 filed Feb. 8, 2000.

FIELD OF THE INVENTION

The present invention is in the field of digital processing and Internet routing devices, and pertains more particularly to apparatus and methods for packet classification and processing.

BACKGROUND OF THE INVENTION

The present invention is in the area of routing devices in packet networks, such as the well-known Internet network, and in the tasks of identifying and processing packets in routing devices. Packets in such a network are logical groupings of data. A packet includes a header, typically having several fields which contain identity and control information. A separate part of the packet contains the main information to be transmitted by a path determined in the routing process.

Routing actions taken by network routing devices are governed by pre-programmed rules, and a typical network routing device can have a large number of rules. A network routing device makes routing decisions based on information coded in header fields of a packet to select a rule that applies to that packet. As described above, a typical network routing device can have many rules and can exercise a number of actions on a packet including, but not limited to routing, dropping, queuing and labeling.

The header fields in a packet may have as many as 128 bits for the next generation Internet Protocol, known in the art as Internet Protocol version 6 (IPv6). Ipv6 is a proposed replacement protocol for the current version of Internet Protocol, referred in the art as IPv4, or Internet Protocol version 4.

The mapping of the values of certain header fields to the set of rules is referred to in the art as packet classification, which is the technology area of the present invention. The function of packet classification enables network managers to specify policies that identify network traffic in order to partition, or classify that traffic into multiple priority levels, and is at the core of functionality in the new generation of network routing devices.

Packet classification is an active area of research, the speed and efficiency of which has been determined by the inventors to have limitations bound by current technology. Previous work in this field has provided some solution to the problem, one example being the Lakshman and Stiliadis solution, summarized below in more detail. This solution is described in a paper entitled "High-Speed, Policy Based Forwarding Using Efficient Multidimensional Range Matching" published by Proc. ACM SIGCOMM September 1998, pp 191–202. This paper is incorporated herein by reference.

Packet classification is a conceptually relatively simple problem turned difficult by the combined demands of speed, dimensionality and size of the fields in the current and impending technology. In terms of speed there is a growing need for processing packets at wire speeds in ports operating at OC-48 and higher. In terms of dimensionality the number of rules may be in the range of thousands, and even hundreds of thousands. The number of fields in IPv4 to be examined for classification is up to 5, and each field can be up to 32 bits long. When newer versions of Internet protocol are used (IPv6), there may well be more fields of greater length and the problems will be multiplied.

What is clearly needed is a method and apparatus for faster and more efficient multi-dimensional mapping of header fields in a packet to a rule or set of rules, and that overcomes the speed limitations in packet classification that exist in current technology. The present invention builds upon previous work in the art, providing a solution to the long-standing problem of the limitations inherent in current technology, at a cost of very little added logic in a system design.

SUMMARY OF THE INVENTION

In a preferred embodiment of the present invention a system for classifying packets, wherein each packet has N header fields to be used for processing is provided, the system comprising a first set of rules associating to the packets by values of the header fields, and a classification system for selecting specific rules in the set of rules as applicable to a specific packet. The system is characterized in that the classification system projects the first set of rules as N-dimensional entities on N axes in N-dimensional space, marking the beginning and ending value on each axis for each rule as a breakpoint, numbers intervals between breakpoints in sequential binary numbers, associates a subset of the first set of rules as applicable in each interval between breakpoints on each axis, then considers a packet as a point in the N-dimensional space according to its header field values, locates the binary numbered interval into which the point projects on each axis by performing a search on each axis for the numbered interval into which the point projects on that axis, thereby determining rules applicable to the packet for that axis, and then determines the specific rules applicable to the packet from the subsets of rules by selecting those rules as applicable to the packet that apply to the packet on all of the N axes.

In one preferred embodiment the search performed on each axis is a binary search conducted by selecting breakpoints at which the bits change for the binary numbered intervals. In other embodiments the search performed on each axis is a quaternary or higher-level M-ary search, where M is a power of 2, conducted by selecting breakpoints at which the bits change for the binary numbered intervals.

In some embodiments association of applicable rules in each numbered interval is made by associating a binary string with each interval, with one bit dedicated to each rule. Also in some embodiments the rules are associated to bit positions in the binary string by priority, the order of priority according to bit significance, and a final rule is selected by the most significant 1 in the matching rules. In preferred embodiments the applicable rules are found by ANDing the binary strings determined for each axis over all axes.

In some embodiments there is at least one hardware pipeline for conducting the search on an axis, the pipeline comprising first, second, and sequential modules for accomplishing increasingly particular portions of the search, wherein, after the first module of the sequential modules is used, determined values from the first module pass to the second module, and values for a second packet enter the pipeline at the first module, the pipeline operations proceeding thus sequentially. There may also parallel pipelines with one pipeline dedicated to searching on each axis in the N-dimensional space, wherein searches are conducted for applicable intervals simultaneously on each axis. Also, applicable rules for each interval on each axis may be represented by individual bitmaps, with each rule assigned a bit position, and the outputs of the parallel pipelines, being the numbered interval on each axis into which the point for a packet projects, may be exchanged for the associated bitmaps, which are then ANDed to determine the applicable rules.

In some embodiments of the invention searching is interleaved, such that results of searching on one or more axes being applied to other axes before searching on the other axes. In some interleaving embodiments rules that are found by search to not apply on one or more axes are not considered in searches conducted on the other axes.

In another aspect of the invention a method for classifying packets in routing, wherein each packet has N fields to be used in processing in a header is provided, comprising the steps of (a) projecting the rules as N-dimensional entities on N axes in N-dimensional space; (b) marking the beginning and ending value on each axis for each rule as a breakpoint; (c) numbering intervals on each axis sequentially with binary numbers; (d) identifying those breakpoints at which bits in the interval numbers change; (e) associating a subset of the rules as applicable in each interval on each axis; (f) considering a packet as a point in the N-dimensional space according to values of the header fields for the packet; (g) determining by search the binary numbered interval on each axis into which the packet point projects; (h) substituting the subset of rules that apply for each determined interval; and (i) selecting those rules as applicable to the packet that associate to the packet on all of the N axes.

In some embodiments of the invention, in step (g), the determination is made by a binary search. Also in some embodiments, in step (g), the determination is made by a quatenary or higher-level M-ary search. In some embodiments of the method, in step (e), association of applicable rules in each numbered interval is made by associating a binary string with each interval; with one bit dedicated to each rule. The rules may be mapped to bit positions in the binary string by priority, the order of priority according to bit significance, and a final rule is selected by the most significant 1 in the matching rules. The matching rules are found by ANDing the binary strings determined for each axis over all axes in step (i). In one embodiment of the method, in step (g), the search is conducted by sequential modules in at least one hardware pipeline, the pipeline comprising first, second, and sequential modules for accomplishing increasingly particular portions of the search, and, after the first module of the sequential modules is used, determined values from the first module pass to the second module, and values for a second packet enter the pipeline at the first module, the pipeline operations proceeding thus sequentially. In this embodiment there may be parallel pipelines with one pipeline dedicated to searching on each axis in the N-dimensional space, with searches conducted for applicable interval simultaneously on each axis.

In some embodiments applicable rules for each interval on each axis are represented by individual bitmaps, with each rule assigned a bit position, and the outputs of the parallel pipeline, being the numbered interval on each axis into which the point for a packet projects, are exchanged for the associated bitmaps, which are then ANDed to determine the second set of matching rules. In some embodiments, in step (g), searching is interleaved, results of searching on one or more axes being applied to other axes before searching on the other axes. In these embodiments rules that are found by search to not apply on one or more axes may not be considered in searches conducted on the other axes.

In another aspect of the invention, in a system for classifying packets by binary or higher-level searching for intervals into which rules project on axes, a method for simplifying a search is provided, comprising the steps of (a) conducting a first search on one or more axes; and (b) using information from the first search to simplify further searching on remaining axes.

In various embodiments of the present invention taught in enabling detail below, for the first time a very fast and reliable method and apparatus is provided for mapping rules to packets in a packet routing device.

BRIEF DESCRIPTION OF THE DRAWINGS

FIG. 2 is a table relating breakpoints in the mapping of FIG. 1 with interval numbers and bitmaps of rule association by interval.

FIG. 4 is a table illustrating a first search step in relating rules to a packet.

FIG. 5 is a table representing a second step in relating rules to packets.

FIG. 6 is a table representing a third step in relating rules to packets.

DESCRIPTION OF THE PREFERRED EMBODIMENTS

In the Lakshman and Stiliadis solution referred to above there are two phases: a pre-processing phase and a packet-by-packet phase. In the pre-processing phase rules are considered as multi-dimensional entities, there being as many dimensions as there are header fields to be used in classification in packets to be processed, and the rule dimensions are projected onto Cartesian axes.

For illustrative purposes, more than three dimensions are difficult to represent graphically, and fields with a large number of bits are cumbersome as well, but the principles of the Lakshman and Stiliadis method as well as features of the present invention may be described for practical purposes in two dimensions. In the following example there are two five-bit header fields for packets, and three rules.

Figure 1:
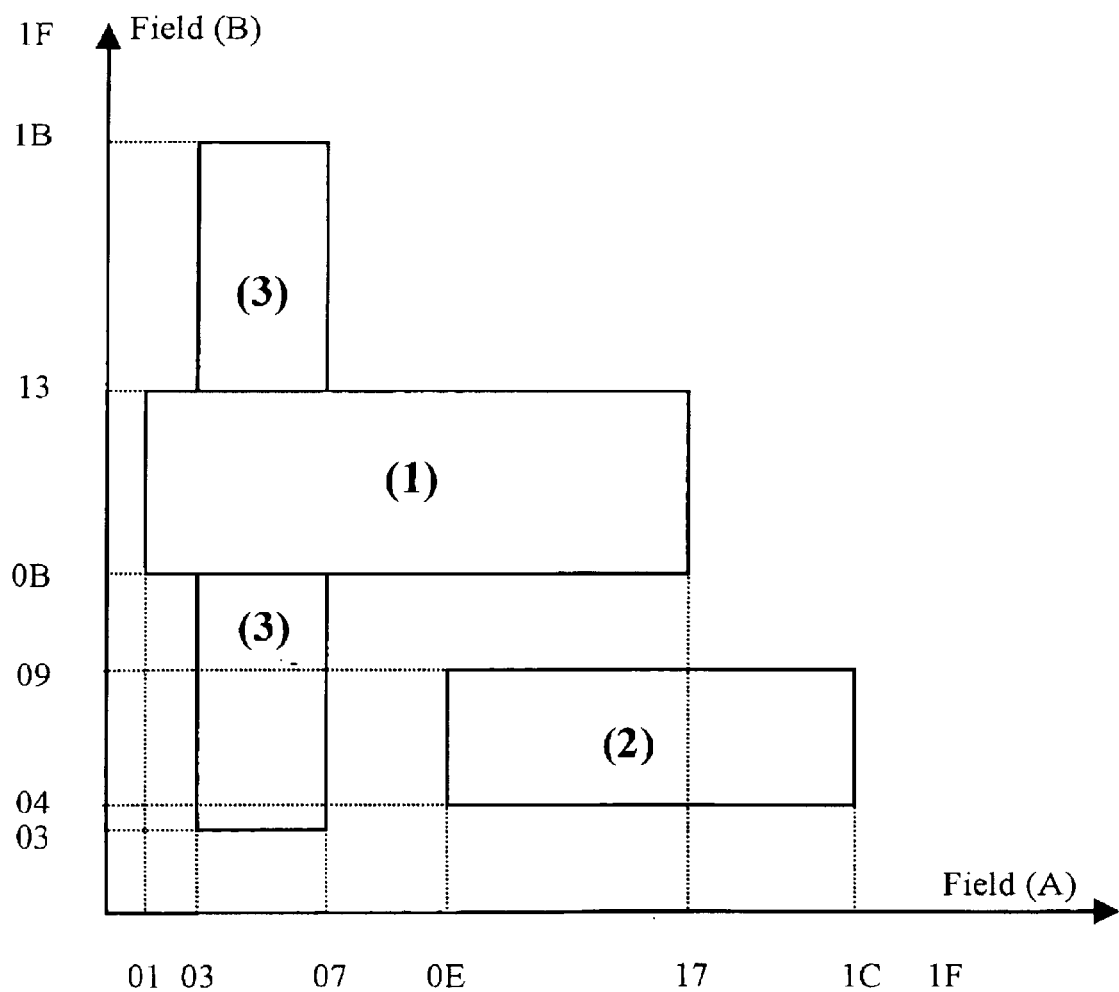
FIG. 1 is a mapping of three rules onto two axes representing two header fields for a packet.

FIG. 1 is a Cartesian representation of three rules labeled (1), (2) and (3) projected on an X-axis and a Y-axis each having a hexadecimal range of 0 to 1F, there being 5 bits in each header. The X-axis represents one of the two header fields, in this case labeled Field (A), and the Y-axis represents the other field, in this case labeled field (B). The position and order of the axes is arbitrary. This representation is reasonable, as rules must associate to header values.

In this rather simple example the upper and lower field value boundaries for each rule are projected onto each axis, creating a series of breakpoints on each axis, the breakpoints establishing a series of intervals on each axis. Consider rule (2) for example. Rule (2) is known to potentially apply to a packet if the value of Field (A) for a specific packet falls between 0E and 1C (HEX), that is, between binary 01110 and binary 11100. Rule (2) projects on the Y-axis for field (B) in the interval between 04 and 09 (HEX). The projections of rules (1) and (2) are similarly shown on the axes. To avoid confusion in these examples, the rules are considered to include the breakpoints. That is, if a header value falls on a breakpoint projected by a rule, that rule is considered to apply. Other conditions may apply in other cases.

In this illustration rule (3) is contiguous (and all rules are contiguous); that is, rules (1) and (3) overlap. In this example there are seven intervals cast on each axis, including the maximum dimension 1F as a breakpoint. For N rules, the maximum number of intervals on an axis, including the maximum dimension as a breakpoint, will be 2N+1, or in this particular example, 7.

Now, also in the pre-processing phase, an N-dimensional bitmap is created and associated with each interval. This bitmap, in this case of 3 bits (N=3), denotes which rules apply relative to the specific interval on the particular axis. For example, in the interval 03 to 07 on the X-axis for field (A) in FIG. 1, both rules (1) and (3) are associated, but not rule (2). The bit map for interval 03 to 07 is therefore 101. A 1 in the ith position indicates that rule i is associated with that interval. The bit order relative to rules is arbitrary, and our example relates bits left to right for fields in ascending numerical order. That is, a 1 in the first bit place from the left (most significant bit) indicates rule 1 is associated in the particular interval.

FIG. 2 is a table created for the intervals on the two axes in our example. There are three columns in the table. The leftmost column shows interval breakpoints, which are the endpoints for each interval (compare with X-axis and Y-axis of FIG. 1) The physical interval in the table is that interval with the listed breakpoint as its endpoint, and the previous breakpoint as its start point.

The middle column in the table of FIG. 2 is a binary number in ascending order from 0 for each interval on each axis. Note for example that for breakpoint (endpoint) 01 for the X-axis, for which the interval is 0 to 01, the interval number is 001. The intervals are numbered to provide, in a preferred embodiment of the invention, a unique way for structuring the process of determining into which interval a header value for a packet in process falls.

The rightmost column in the table of FIG. 2 is the bitmap for the interval, which relates the rules that apply for that interval. In the case of interval number 001, from 0 to breakpoint 01, the bitmap is 000, as no rule projects on the X-axis in this interval (see again FIG. 1).

The skilled artisan will be able to follow the breakpoints, interval ordering, and bitmaps for the rest of the X-axis and for the Y-axis for the table of FIG. 2 in this example.

It needs to be said at this point that the pre-processing phase, including all projections, interval ordering, and bitmaps, remains stable as long as the rule set is stable, and needs to be edited and updated only when rules change. In some cases the rules will change frequently, and in others the rules will change only at longer intervals. In a routing device the rules may change for any of a number of reasons, such as load factor, time-of-day, and so on. There may be software for monitoring conditions and changing the rule set that applies, or rule changes may be accomplished by manual input.

In the packet classification process, given a specific set of rules, and assuming the pre-processing phase is done, resulting in the table of FIG. 2, operation proceeds in the packet-by-packet phase. In the packet-by-packet phase, packets are taken one-at-a-time, and the applicable rule(s) are determined according to the values of the header fields (two fields considered in this example).

Figure 3:
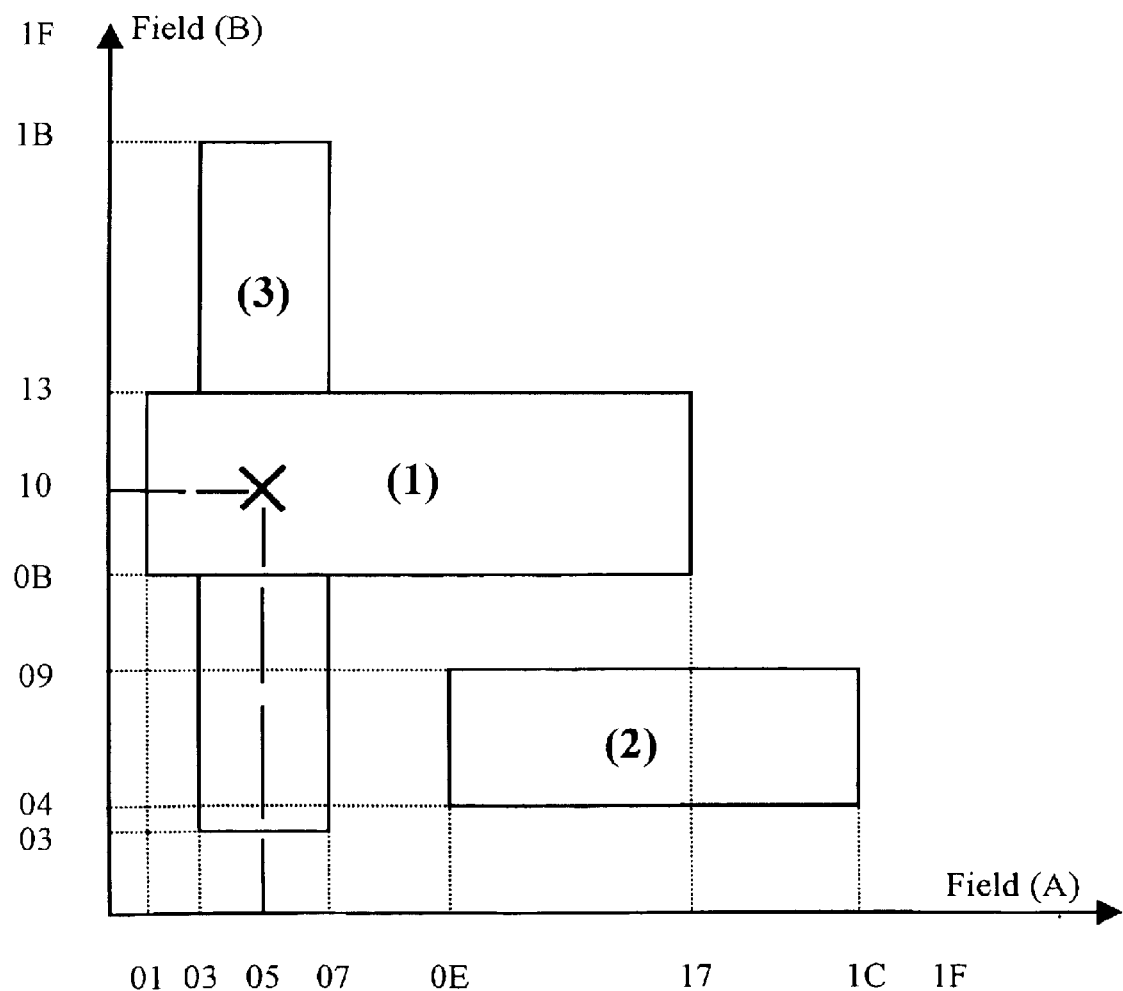
FIG. 3 is the graphical representation of FIG. 1 with a specific packet represented.

FIG. 3 is the same as FIG. 1, except a packet in process is represented by a point X in the two-dimensional space. The point is located by the field values for fields A and B. It may be assumed that this packet has been acquired by the system for the purpose of determining the rule which is to be used to process the packet. Although two fields, thus two dimensions, are used in this example, the skilled artisan will recognize that a packet may be represented by a point in N-dimensional space, such as in as many as five dimensions for IPv4.

In FIG. 3 the packet acquired for processing has a field value of 10 (HEX) in Field (B) and 05 (HEX) in Field (A). To determine the applicable rule or rules, binary searches are done in a preferred embodiment of the invention, typically in parallel for the two axes (fields). The object of the binary searching is to determine the interval on each axis within which a projection of the point X falls. Considering, for example, the X-axis, this is done by selecting pertinent break points (being the projections of edges of rules on the axis), and determining, step-by-step, whether the projection of the packet point is greater than or less than the break point. By process of elimination the interval into which the point projects can be isolated incrementally.

A unique contribution in a preferred embodiment of the present invention is in determining the best break points and methods to accomplish the search in the least number of steps. There are, of course, a number of ways one may select among the breakpoints and the search may be conducted, some of which are less reasonable than others.

As an example of a relatively inefficient method, one might select among the existing breakpoints without preference, and do a compare of the selected breakpoint value with the packet point projection, yielding where the point lies relative to the selected breakpoint. Referring again to FIG. 3, consider, for example, a first step on the X-axis using the breakpoint 1C. A compare will show that the point 05 lies to the left of 1C, eliminating the interval from 1C to 1F. One may then select any one of the breakpoints between 01 and 1 C, and continue the process. Eventually the correct interval will be isolated.

Another possibility is to select breakpoints considering the binary value of the breakpoints, at a point at where the most significant bit of the X-value changes. In the present example, 0E is 01110 and 17 is 10111. In this scheme one would select 17 as the first breakpoint. In this scheme the search continues by selecting breakpoints on the axes where the second bit changes, the third bit changes, and so on to the fifth bit.

The present inventors, however, have determined an improved process, and have elected to number the intervals sequentially in binary, and to select breakpoints by the sequentially numbered intervals (middle column in FIG. 2). This scheme has an advantage in that there are three bits in the sequential interval numbers (in this example) rather than five bits to deal with in the axis values. In a preferred embodiment of the present invention the steps in the search proceed as follows:

Step 1: Breakpoint 07 is selected on the X-axis precisely because the interval number (middle column in FIG. 2) of all intervals on the X-axis to the left of (less than) this breakpoint have a 0 in the most significant bit (MSB) of the interval number, and the interval number of all intervals to the right of (greater than) this breakpoint have 1 in the MSB. Breakpoint 09 is selected for the first step for the Y-axis because the interval number of all intervals above 09 on the Y-axis have 1 as the MSB and the interval number of all intervals below 09 on the Y-axis have 0 as the MSB. Step 1 in the binary search for each field axis is represented in FIG. 4, with the result, which is a pointer to the next step. This operation for the X-axis compares the value of field (A), which is 05 for the packet in process, to the breakpoint 07. Since 05<07 it is determined that the MSB of the interval number of the interval in which the field value lies is 0. A similar comparison on the Y-axis, using the breakpoint 09, at which value the MSB changes, compares 10 to 09, and yields 1, because 10>09. These values from step 1 become pointers to step 2 for each axis. The step for the X-axis and the Y-axis are done in parallel in a preferred embodiment, and for all axes in cases with many more axes. After Step 1 the MSB of the interval number into which the point projects on each axis is determined.

Step 2: The table of FIG. 5 illustrates step 2. In the first column are the possible values of the pointer from step 1 (either 1 or 0 in this example) for each field. The second column is for the breakpoint to determine the next MSB, which is the middle bit of the three-bit interval number sought in this example. Referring to FIG. 2 and FIG. 3, it is seen that, for the X-axis, if the pointer to step 2 is 1, the value of field (A) on the x-axis will be in an interval between 07 and 1F, while if the pointer to the second step is 0 the value of Field (A) will be in an interval between 00 and 07. In the range from 07 to 1F, the value of the second bit for the interval numbers changes at 17, so 17 is the selected breakpoint. In the interval between 00 and 07 the breakpoint for the middle bit is 01. For the Y-axis for field (B), if the pointer to the second step is 1 the interval sought is an interval in the range from 09 to 1F, and the selected breakpoint is 13, where the second MSB changes value. If the pointer to the second step for the Y-axis is 0, the value lies in the overall interval from 00 to 09, and the breakpoint for the middle bit is 03. So step 2 compares the value of Field (A) with 17 if the pointer is 1 and to 03 if the pointer is 0. If the pointer is 1 and the field value is >17, the pointer to the third step is 11. If the field value is <17 the pointer to the third step is 10. If the pointer is 0, and the field value is >01, the pointer to the third step is 01, and if the <01 the pointer to the third step is 00. Similarly, for the Y-axis for field (B), if the pointer is 1 the comparison is the value of field (B) with 13. If the value is >13 the pointer to the third step is 11, and if the value is <13 the pointer to the third module is 10. If the pointer to the second step is 0, the comparison is with 03, and if > the pointer to the third step is 01, and if < the pointer to the third step is 00.

For the packet in process in this example, having field (A)=05 and field (B)=10, the pointer to the third step is 01 for field (A), because 05>01, while the pointer to step 3 for field (B) is 10, because 10<13. The first and second MSBs for the interval numbers sought on each axis are now determined.

Step 3: FIG. 6 illustrates step 3 in general. The first column is the entry point, being the pointer from the second step. The second column is the breakpoint at which the value of the least significant bit (LSB) of the interval number changes for the overall interval in which the value is known to lie, and the comparisons and results are shown in the third column. In the present example the pointer from the second step for field (A) is 01, and for field (13) is 10. For field (A) 05>03, so the final result of the binary search on the X-axis is interval number 011. For field (B) 10<0B, so the final result for the Y-axis is interval number 101.

Step 4: Step 4 relates the rules to the packet in process by virtue of the interval numbers on the two axes in which the point determined by the field values for the packet project. This is done by entering the table (FIG. 2) which relates numbered intervals to the bitmaps that associate rules to intervals. The binary searches on the axes have determined the numbered interval on each axis within which the point determined by the field values of the packet in process lie. Entering the table of FIG. 2 it is seen that the binary bit map relating rules to intervals has bit map 101 for interval 011 on the Y-axis and bit map 101 for interval 101 on the Y-axis.

Step 5: The fifth step combines the bit map for the interval on the X-axis within which the point projects, with the bit map for the interval on the Y-axis within which the point projects. This a logical AND operation, which yields 101 AND 101=101.

The final result for this rather simple example is the bit map 101, indicating that rules 1 and 3 both potentially apply to the packet for which the field values of the header are 05 and 10 for field (A) and field (B) respectively.

Since two rules potentially apply but just a single rule must be selected in this example, there is default logic to select the applicable rule. In this example, when more than one rule applies, the rule of MSB applies. The MSB of the AND result (101) is for rule 1, so rule 1 is applied to the packet in process. In other embodiments there may be other defaults and algorithms for tie-breaking when more than one rule potentially applies. Also, there will be a default for the result wherein no rule is found to apply in the classification process.

It will be apparent to the skilled artisan that the illustration would be considerably more complex for as many as five fields of up to 32 bits each and a large number of rules (IPv4), and even more complex for developing Internet protocols for future use. The example provided, however, fairly illustrates and teaches the method in a preferred embodiment of the invention.

In the embodiment of the present invention described in step-by-step progress above, as each packet arrives to be processed in the packet-by-packet phase, the several steps are performed and the best rule is selected for that packet, then another packet is processed. Again, as before, if the rules change, the mapping of the rules to axes has to change as well (pre-processing phase) before further packets may be processed. Of course, tables for multiple rule sets may be stored, and the correct table selected when rules change.

In another embodiment of the invention a significant improvement is made in the packet-by-packet phase. This improvement results from the present inventors discovering that the step-by-step parallel process is amenable to a pipelined structure and operation.

Figure 7:
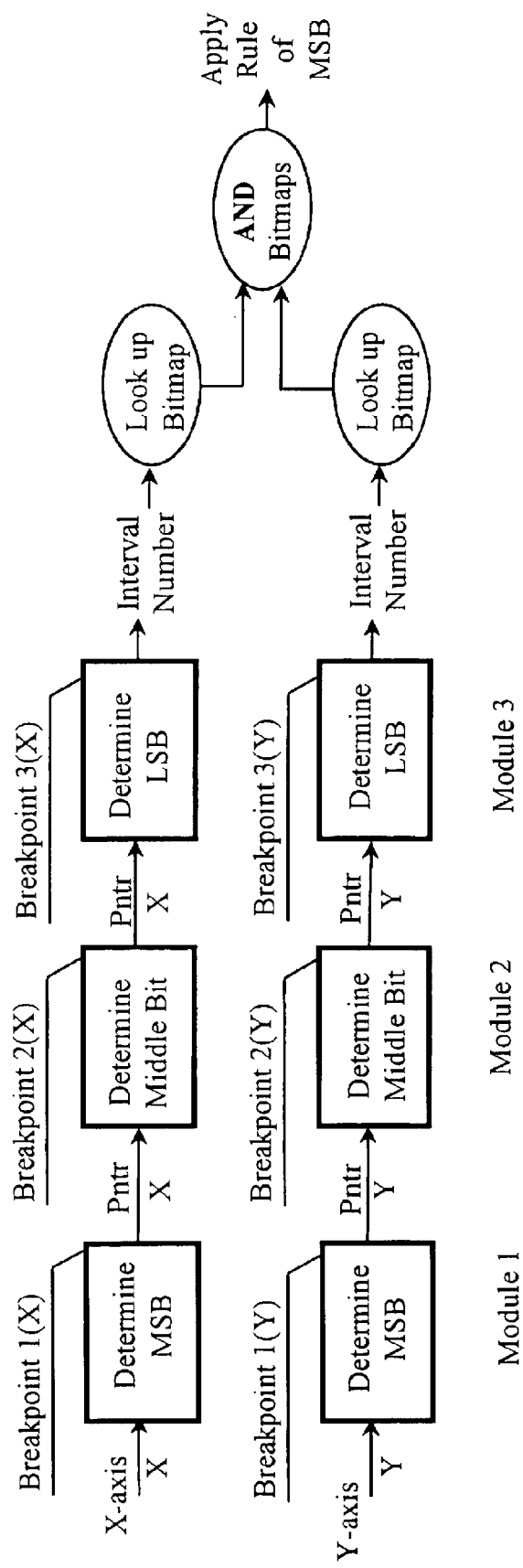
FIG. 7 is an illustration of a pipelined process for processing packets in an embodiment of the preset invention.

FIG. 7 is a structure and flow diagram for a pipelined search implementation in an embodiment of the present invention. There are three modules in each pipeline, labeled modules 1, 2, and 3, and two pipelines, one for each axis in our simple example. In other cases, depending on the number of rules and header fields, the number of modules in a pipeline and the number of pipelines may also change. The modules in a preferred embodiment are cascaded hardware structures with associated registers for changing breakpoints and other data.

Firstly, in the pre-processing phase, rules are projected on the axes, and intervals are determined and numbered. The appropriate breakpoints for MSB, middle bit and LSB are determined and stored, and the first breakpoints (MSB) for module 1 for each dimension (axes X and Y) are loaded into modules 1 for each pipeline. Referring back to the step-by-step process taught above, it will be clear to the skilled artisan that the module 1 breakpoint will not change. The breakpoints used for succeeding modules will depend on the result of the immediately preceding modules. There are several ways this may be handled. In some embodiments each module has hardware structure for each possibility from the preceding module. In other embodiments the result (pointer) from a preceding module selects the breakpoint for the next module as processing proceeds.

As an example of the structure and operation of sequential modules, reference is made again to the steps described above with respect to FIGS. 2–5. The first breakpoint for the X axis is 07 and the first breakpoint for the Y axis is 09 (FIG. 4). X and Y from Field (A) and Field (B) for a first packet are fed into Module 1 of each pipeline. Module 1 for the X-axis determines on which side of 07 the point falls, and module 1 for the Y-axis determines on which side of 09 the point falls. Module 1 for each pipeline generates a pointer to the second module, and passes the point values X and Y of the first packet to the second module. Depending on the result of the compare in the first module, the correct breakpoint is set for the compare to be made in the each of the second modules. At the same time header field values for a second packet are loaded into module 1 for each axis.

In some embodiments the hardware structure allows for all possible breakpoints, which are loaded into the pipeline modules in the pre-processing phase. There are, in this case alternate paths in the hardware for the second module, and the path is selected by the value of the pointer from module 1 for each pipeline. In this example the alternative breakpoints for module 2, which are 17 or 01 for the X axis, and 13 or 03 for the Y-axis (see FIG. 5). The correct path is taken based on the pointer from module 1 in each pipeline. Module 2 for each axis determines the middle bit for the interval sought for the packet-in-process at module 2. At the same time module 1 for each axis is determining the MSB for a new packet.

Module 2 now passes a pointer and the X and Y values to module 3 for each axis. At the same time module 1 passes a pointer and the X and Y values for the second packet-in-process to module 2, and values for a third packet are loaded into module 1 for each axis.

Module 3 may allow for alternative hardware paths for all of the possibilities from module 2 for each axis, or the pointer values may be used to select the correct breakpoints to be loaded to the third modules in each pipeline (see FIG. 6).

Module 3 for each axis determines the LSB for the first packet-in-process. The interval number on each axis is now known for the first packet, as is shown at the output of module 3 for each axis in FIG. 7.

In a next cycle, knowing the interval number, a table lookup returns the rule-association bitmap for the interval number determined for each axis for the first packet, and at the same time new values are loaded into the three modules as described above (see FIG. 2). In each cycle, a step is taken for each packet in each pipeline. At the end of the two pipelines an AND operation resolves the bitmaps (in this case 2 bitmaps) into one bitmap, and the correct rule is selected by default logic. In the present example the logic is that the rule associated from the AND operation with the MSB is the rule to be applied to the packet.

The pipelined operation proceeds, loading a new point (header field values for a new packet to be processed) into modules 1, and moving point values and pointers to next modules, and determining the rule to be used for packets emerging from the pipeline, as long as the rules do not change. At a rule change new breakpoints are determined as appropriate, which also proceeds in a sequential fashion across the pipeline, assuring that the right breakpoints are used for the right packets in process.

There are advantages (throughput) in many cases to accomplishing as much as possible with hardware and pipelined structure. As the structure is hardware, however, the structure itself may not be readily changed physically in a particular machine. The number of header fields for packets, however, remains constant over long periods of time. As long as determinations are being made for IPv4 packets, for example, the number of header fields to be used in classification is up to 5 and the field length is up to 32 bits. Therefore the number of modules provided will be, in a preferred embodiment, enough to accommodate the situations expected to be encountered. The inventors believe, at the time of the present filing, that ten modules will be adequate for most embodiments of the invention. For applications where fewer modules are needed, there will be provision for taking the output of the last needed module and feeding that into the table lookup for rule association, leaving some pipeline modules idle. The skilled artisan will recognize there are a number of ways this may be done.

In alternative embodiments of the invention the pre-processing phase for rules changes may be done in any of a variety of ways. For example, rules changes may often be incremental rather than drastic. There will typically be known rule sets with which to deal as well. In preferred embodiments known rule sets will be stored, together with pre-selected breakpoints and other data associated with or calculated from the rule sets, according to fields and headers for packets to be processed, and provision is made for very rapid allocation of breakpoints, and so forth, at the times that pre-processing is needed. It will also be true that there may be cases where the rules change, but the change will not effect, or will not seriously effect the application of rules to packets, and there is no need to recalculate or redistribute breakpoints for the pipeline structure.

In another aspect of the present invention the inventors have determined that the search process, which is amenable to pipelining, is also amenable to an M-ary search, where M is a power of 2. One might do a quaternary search, for example, and in a specific application a quaternary (or higher-level) search may be advantageous. In following description a quaternary search will be used as an example, but the inventors intend that the description can also apply to higher-level searches as well. In binary searches one bit is determined at a time. In a quaternary search two bits, and in an M-ary search, where $M=2^k$, and k=1, 2, . . . n, the search determines k bits at a time.

Figure 8B:
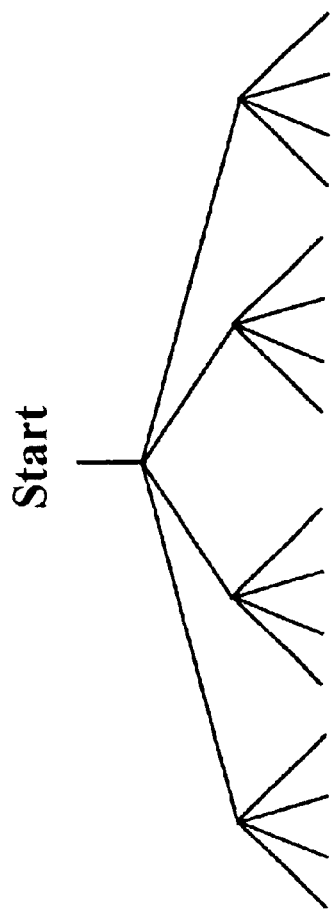
FIG. 8b is an illustration of branching in a quatenary search process.
Figure 8A:
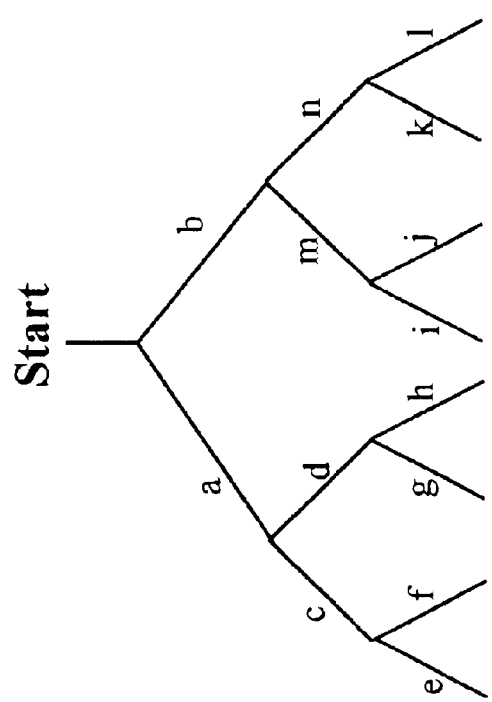
FIG. 8a is an illustration of branching in a binary search process.

FIGS. 8a and 8B illustrate the decision paths in a binary search and a quaternary search, respectively. In the binary search shown in FIG. 8a, from start the decision path is either a or b, then c or d if a, or m or n if b, and so on. At each decision point the path goes either one way or the other of two possibilities. In the quaternary search of FIG. 8b there are four alternative paths at each decision point.

In general for the quaternary search the logic for a hard-wired module is more robust. Also, there needs to be more than one break point considered. The decision in the quatenary search typically involves logic of the sort: 1F a>b AND c>d, then e, OR if a<b AND f>g, then h, OR (and so forth). The logic can be worked out and implemented in silicon to do the quatenary search, and the necessary structures are within the ability of those with ordinary skill in the art.

The inventors have provided in another embodiment of the present invention yet another novel way to do a search, for those cases when the circumstances warrant, and it can be done with structure little different in hardware than that designed for binary searching.

Figure 9:
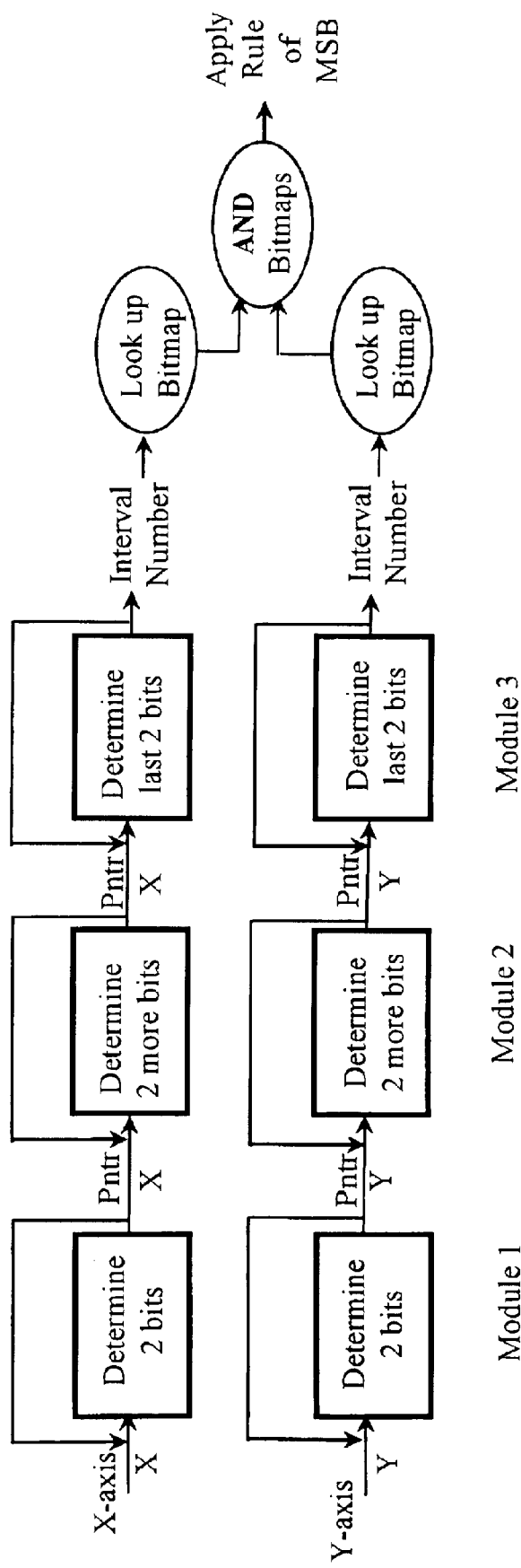
FIG. 9 is an illustration of an alternative pipelined process in an embodiment of the present invention.

FIG. 9 is a pipeline structure similar to that illustrated in FIG. 7 having three modules and two pipelines, which is capable of resolving intervals for which the structure of FIG. 7 would require six modules. In FIG. 9 the indication of registers for breakpoints as illustrated in FIG. 7 has been removed to avoid the drawing becoming confused, but the breakpoint registers are still associated with the modules. In the pipelines of FIG. 9 the basic hardware structure is essentially the same as in FIG. 7, and the operations are much the same, except each module is used twice. The return loop arrow shown from the output of each module back to the input of the same module illustrates this repeated use.

The pipelines of FIG. 9 operate as follows: Field values for a first packet enter module 1, and module 1 now has access to the first breakpoint for the MSB the module outputs a pointer indicating the compare for the MSB, and that pointer is fed back into module 1 as indicated by the return loop arrow. At the same time the pointer is fed back the breakpoint is indexed to the breakpoint to find the next most significant bit. The operation of the same module then determines the next significant bit for the interval number. After the second pass for a module, the pointer goes to the next module.

The net effect of the pipelines of FIG. 9 is that each module provides a double step and the overall pipeline length is shortened. It is possible, to use a single binary search module any number of times, rather then twice as described above, and many alternative structures are provided for different situations, saving silicon real estate and gates at the expense of latency in indexing breakpoint values and the like. There are situations and circumstances where this may be advantageous, and circumstances where the longer pipelines may be advantageous.

In yet another aspect of the present invention, the inventors have determined that there may be special circumstances wherein interleaving between pipelines may be in order. Consider, for example, the case where a large number of rules may be disqualified in a search done on one axis. Since, to be applicable to a packet, a rule has to be applicable on all axes, any rules that do not apply on one axis do not have to be considered on another axis. If the pipeline process is performed entirely in parallel, then the search is done for all rules in the parallel pipeline for each axis, yet the search might be greatly simplified (fewer intervals for projection of fewer rules) if the pre-processing were redone for a second axis after eliminating rules in a search done on the first axis. There would, of course, be a penalty of the loss of the advantage of the parallel pipelining. In some cases the reduction in time for succeeding searches might more than offset the penalty of the loss of parallelism.

There are a great variety of ways that interleaving might be done. For example, in one embodiment, all of the rules may be projected on a first axis, breakpoints determined, intervals numbered, and then a single step-by-step process using an appropriate number of modules is used to complete a search on the first axis for a candidate packet. The pipeline may be constructed in any of the ways herein discussed; for instance to perform a binary search, a quaternary search, to reuse modules, and so forth.

In this first exemplary embodiment, once the interval is determined on one axis in which the first packet projects, the table lookup is done for the bit map that associates rules to intervals, and the bitmap is saved. Now use is made of the information just determined, that the candidate packet associates with certain rules as a result of its projection on the first axis, but equally importantly, there is an entire set of rules with which the packet does not associate. Returning to FIG. 3 and the associated descriptions above, it may be seen that rule 2 is ruled out in the first step. The candidate packet having X(05) and Y(10) projects on the X-axis in consecutively numbered interval number 011, and rule 2 does not apply.

The search on the Y-axis may now be simplified. Only two rules are still candidates after the search on the X-axis, so the number of intervals on the Y-axis is fewer (5 instead of 7). The search on the Y-axis, then, will require fewer modules, and the rule association on the Y-axis may be determined more quickly than on the X-axis. Once the bit map is determined for the Y-axis, it is ANDed with the saved bit map from the X-axis, and the final rule selection is made.

It will be apparent that in more sophisticated situations, wherein there are many rules, there may be situations where a first pass on a single axis will eliminate most of the rules. In such situations perhaps only very few additional axes may have to be considered until only one rule (or no rule) is found to be applicable, at which point the classification is complete.

In still another alternative embodiment, after a first pre-processing phase, in which rule projections are made, intervals are numbered, and breakpoints assigned to whatever hardware structure is provided for the search function, short test searches are made to determine the apparent advantage of various approaches. For example, one makes a short search on the X-axis utilizing just one binary search module, and records which (and how many) rules are eliminated. The same short search is then done for a second axis, and the result compared with the result of the first short search. When (and if) a first short search yields a large sacrifice of rules, that is, a great proportion of the rules are ruled out, then the intervals are recast on the remaining axes, and the searches continued. In this embodiment, as a further refinement, once a large number of rules are ruled out, the pre-processing phase is redone, and the search proceeds with the full complement of parallel pipelines., requiring a significantly foreshortened search process.

The inventor notes here, that in these embodiments and variations of these embodiments, once a first pre-processing phase is done for the full contingent of rules, it is not necessary that the pre-processing be redone because certain rules are eliminated as candidates for a packet in process. Rather, the tables for numbering, rule association, and the like can be altered in a systematic manner, because all of the information required on any axis for a subset of the original rules will be in the information for the full set of rules.

In yet another slightly different embodiment, a set of breakpoints may be defined based simply on the range on the axes (a function of the number of bits in a header field for a packet), rather than by projecting the rules on the axes. These defined (and constant for range) breakpoints may simply divide the axis into equal-length intervals of any convenient number, preferably in powers of two. For example, 16 intervals. Foreshortened searches may be made on the basis of these defined intervals to determine expected advantage, then the projected interval breakpoints may be used in the subsequent long search.

In still other embodiments, there will be statistical operations and other historical functions. In these embodiments separate logic determines load factors and trends for types of packets, and applies selectivity in classification operations based on statistical variations. For example, if the statistical operations determine that a great preponderance of packets are of the same type, source, and destination over a period of time, then the classification process may be greatly simplified until the mix and load factors change.

The skilled artisan will realize that there are a large number of alterations that might be made in the embodiments described herein, and that different designers might design the hardware and procedures differently in many cases, while staying well within the bounds of spirit and scope of the present invention. The scope of the invention, then, should be limited only by the claims which follow.

What is claimed is:

1. A system for classifying packets, wherein each packet has N header fields to be used for processing, the system comprising:
   a first set of rules associating to the packets by values of the header fields; and
   a classification system for selecting specific rules in the set of rules as applicable to a specific packet;
   characterized in that the classification system projects the first set of rules as N-dimensional entities on N axes in N-dimensional space, marking the beginning and ending value on each axis for each rule as a breakpoint, assigns one of a sequence of binary interval numbers to each interval between breakpoints such that all adjacent intervals are numbered in ascending sequential binary order and such that each of the binary interval numbers has a number of bits that is less bits than the number of bits for axis values corresponding to the breakpoints, associates a subset of the first set of rules applicable in each interval to the binary interval number of the appropriate interval between breakpoints on each axis, then considers a packet as a point in the N-dimensional space according to its header field values, locates the binary interval number assigned to the interval into which the point projects on each axis by performing a search on each axis for the interval into which the point projects on that axis, thereby determining rules applicable to the packet from the subsets of rules by selecting those rules as applicable to the packet that apply to the packet on all of the N axes.

2. The system as recited in claim 1, wherein the search performed on each axis is a binary search conducted by selecting breakpoints at which the bits change for the binary interval numbers.

3. The system as recited in claim 1, wherein the search performed on each axis is a quaternary or higher-level M-ary search, where M is a power of 2, conducted by selecting breakpoints at which the bits change for the binary interval numbers.

4. The system of as recited in claim 1, wherein association of applicable rules in the each interval is made by associating a binary string with the each interval, with one bit dedicated to each rule.

5. The system as recited in claim 4, wherein rules are associated to bit positions in the binary string by priority, the order of priority according to bit significance, and a final rule is selected by the most significant 1 in the matching rules.

6. The system as recited in claim 4, wherein the applicable rules are found by ANDing the binary strings determined for each axis over all axes.

7. The system as recited in claim 1, comprising at least one hardware pipeline for conducting the search on an axis, the pipeline comprising first, second, and sequential modules for accomplishing increasingly particular portions of the search, wherein, after the first module of the sequential modules is used, determined values from the first module pass to the second module, and values for a second packet enter the pipeline at the first module, the pipeline operations proceeding thus sequentially.

8. The system as recited in claim 7, comprising parallel pipelines with one pipeline dedicated to searching on each axis in the N-dimensional space, wherein searches are conducted for applicable intervals simultaneously on each axis.

9. The system as recited in claim 8, wherein applicable rules for the each interval on each axis are represented by individual bitmaps, with each rule assigned a bit position, and wherein the outputs of the parallel pipelines, being the interval on each axis into which the point for a packet projects, are exchanged for the associated bitmaps, which are then ANDed to determine the applicable rules.

10. The system as recited in claim 1, wherein searching is interleaved, and wherein results of searching on one or more axes is applied to other axes before searching on the other axes.

11. The system of as recited in claim 10, wherein rules that are found by search to not apply on one or more axes are not considered in searches conducted on other axes.

12. A method for classifying packets in routing, wherein each packet has N fields to be used in processing in a header, comprising:
    projecting the rules as N-dimensional entities on N axes in N-dimensional space;
    marking the beginning and ending value on each of the N axes for each rule as a breakpoint;
    assigning one of a sequence of binary interval numbers to each intervals between breakpoints on the each of the N axes such that all adjacent intervals are numbered sequentially in ascending binary order, wherein each of the binary interval numbers has a number of bits less than the number of bits for axis values corresponding to the breakpoints;
    identifying those of the breakpoints at which bits in the binary interval numbers change;
    associating a subset of the rules as applicable to the one of the sequence of binary interval numbers for the each interval on each axis;
    considering a packet as a point in the N-dimensional space according to the values of the header fields for the packet;
    determining by search a particular binary interval number of the corresponding to a particular interval on each axis into which the packet point projects;
    substituting the subset of rules that apply for the particular interval for the each axis; and
    selecting those rules as applicable to the packet that associate to the packet on all of the N axes.

13. The method as recited in claim 12, wherein the determining comprises performing a binary search.

14. The method as recited in claim 12, wherein, the determining comprises performing a quaternary or higher-level M-ary search.

15. The method as recited in claim 12 wherein, the associating of applicable rules to the one of the sequence of binary interval numbers comprises associating a binary string with each interval, with one bit dedicated to each rule.

16. The method as recited in claim 15, wherein the rules are mapped to bit positions in the binary string by priority, the order of priority according to bit significance, and a final rule is selected by the most significant 1 in the matching rules.

17. The method as recited in claim 15, wherein the selecting comprises ANDing the binary strings determined for each axis over all axes to determine those rules applicable to the packet.

18. The method as recited in claim 12, wherein the determining comprises conducting the search by sequential modules in at least one hardware pipeline, the pipeline comprising first, second, and sequential modules for accomplishing increasingly particular portions of the search, and wherein, after the first module of the sequential modules is used, determined values from the first module pass to the second module, and values for a second packet enter the pipeline at the first module, the pipeline operations proceeding thus sequentially.

19. The method as recited in claim 17, wherein the determining comprises employing parallel pipelines with one pipeline dedicated to searching on each axis in the N-dimensional space, and wherein searches are conducted for applicable interval simultaneously on each axis.

20. The method as recited in claim 19, wherein applicable rules for each interval on each axis are represented by individual bitmaps, with each rule assigned a bit position, and wherein the outputs of the parallel pipeline, being the numbered interval on each axis into which the point for a packet projects, are exchanged for the associated bitmaps, which are then ANDed to determine the second set of matching rules.

21. The method as recited in claim 12 wherein the determining comprises an interleaved search, and wherein results of searching on one or more axes are applied to other axes before searching on the other axes.

22. The method as recited in claim 21, wherein rules that are found by search to not apply on one or more axes are not considered in searches conducted on the other axes.

23. In a system for classifying packets by binary or higher-level searching for intervals into which rules project on axes, a method for simplifying a search, comprising:

projecting the rules as N-dimensional entities on N axes in N-dimensional space;

marking the beginning and ending value on each of the N axes for each rule as a breakpoint assigning one of a sequence of binary interval numbers to each interval between breakpoints on the each of the N axes such that all adjacent intervals are numbered sequentially in ascending binary order, wherein each of the binary interval numbers has a number of bits less than the number of bits for axis values corresponding to the breakpoints;

identifying those of the breakpoints at which bits in the binary interval numbers change;

conducting a first search on one or more axes; and using information from the first search to simplify further searching on remaining axes.

* * * * *